United States Patent
Bandis et al.

(10) Patent No.: US 8,475,099 B2
(45) Date of Patent: Jul. 2, 2013

(54) SELF-CLINCHING BLIND FLOATING FASTENER

(75) Inventors: Steven D. Bandis, West Jordan, UT (US); Russell J. Maxfield, Riverton, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 176 days.

(21) Appl. No.: 13/090,592

(22) Filed: Apr. 20, 2011

(65) Prior Publication Data
US 2012/0269597 A1  Oct. 25, 2012

(51) Int. Cl.
*F16B 39/284* (2006.01)

(52) U.S. Cl.
USPC .......................................... 411/111; 411/181

(58) Field of Classification Search
USPC .................................. 411/111, 113, 180, 181
See application file for complete search history.

(56) References Cited

U.S. PATENT DOCUMENTS

| | | | | |
|---|---|---|---|---|
| 2,078,411 | A * | 4/1937 | Richardson | 411/113 |
| 3,180,387 | A * | 4/1965 | Dzus et al. | 411/111 |
| 4,295,766 | A * | 10/1981 | Shaw | 411/113 |
| 5,020,952 | A * | 6/1991 | Zeigler et al. | 411/113 |
| 5,245,743 | A * | 9/1993 | Landy et al. | 29/523 |
| 7,516,534 | B2 * | 4/2009 | Easterbrook et al. | 29/509 |

OTHER PUBLICATIONS

"Blind Self-Clinching Fasteners," PennEngineering, Bulletin, pp. 1-4.
"Floating Self-Clinching Fasteners," PennEngineering, Bulletin, pp. 1-4.
"The Self-Clinching Fasteners Handbook," PennEngineering, pp. 1-13.

* cited by examiner

*Primary Examiner* — Gary Estremsky
(74) *Attorney, Agent, or Firm* — Patent Law Group LLP; David C. Hsia

(57) ABSTRACT

A fastener device includes a self-clinching retainer and a blind fastener. The self-clinching retainer is mounted to a hole in a sheet. The blind fastener is at least partially floating within the self-clinching retainer. The blind fastener has blind thread so that any debris from engaging another fastener is captured within the blind fastener.

8 Claims, 4 Drawing Sheets

SELF-CLINCHING BLIND FLOATING FASTENER

FIELD OF INVENTION

This invention relates to a self-clinching blind floating fastener for sheet materials.

DESCRIPTION OF RELATED ART

A self-clinching fastener is any device, usually threaded, that when pressed into ductile metal or other sheet materials, displaces the host material around the mounting hole, causing it to cold flow into a specifically designed annular recess in the shank or pilot of the fastener. A floating self-clinching fastener is a floating threaded element that can compensate for any mating hole misalignment.

SUMMARY

In one or more embodiments of the present disclosure, a fastener device includes a self-clinching retainer and a blind fastener. The self-clinching retainer is mountable to a hole in a sheet. The blind fastener is at least partially floating within the self-clinching retainer. The blind fastener has blind thread so that any debris from engaging another fastener is captured within the blind fastener.

BRIEF DESCRIPTION OF THE DRAWINGS

In the drawings.

Use of the same reference numbers in different figures indicates similar or identical elements.

DETAILED DESCRIPTION OF THE INVENTION

Figure 1:
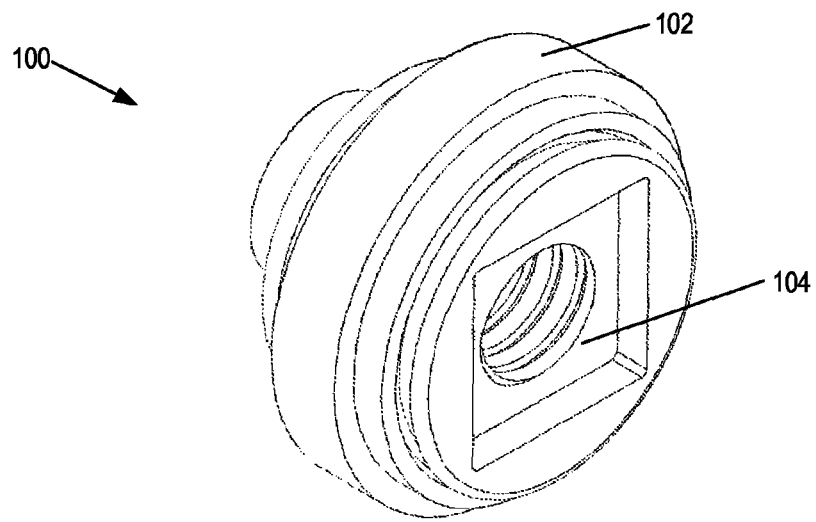
FIG. 1 shows an isometric view of a self-clinching blind floating fastener device in one or more embodiments of the present disclosure.

FIG. 1 shows an isometric view of a self-clinching blind floating fastener device 100 in one or more embodiments of the present disclosure. Fastener device 100 provides a strong female thread in sheets that are too thin to be conventionally tapped. The floating action of fastener device 100 allows adjustment for any mating hole misalignment.

Figure 2:
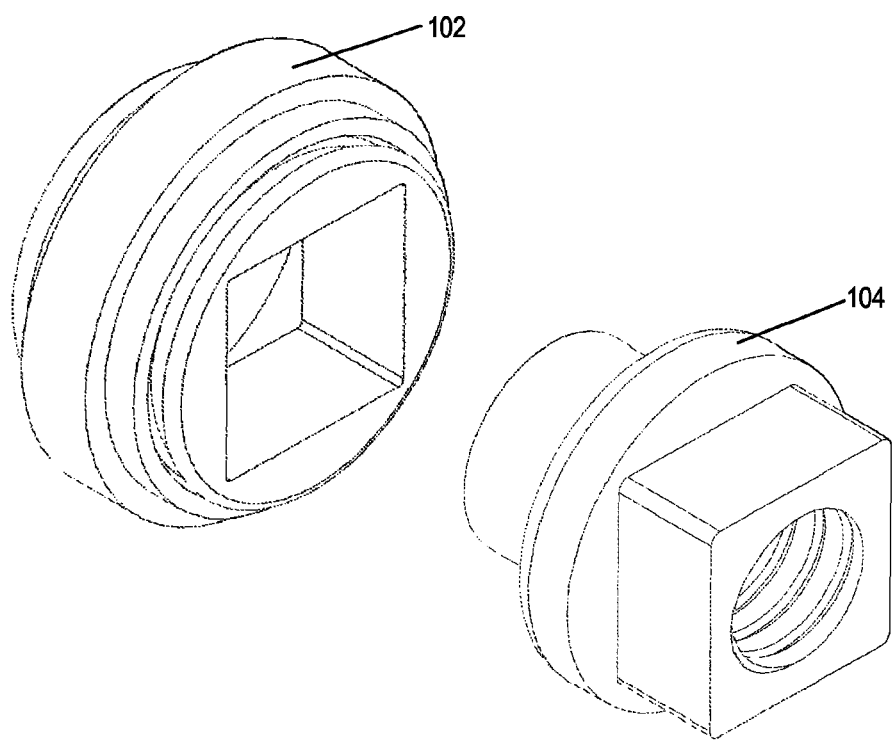
FIG. 2 shows an isometric view of a fastener separated from a retainer of the fastener device in one or more embodiments of the present disclosure.

Fastener device 100 includes a self-clinching retainer 102 and a floating blind fastener 104 permanently captured by the retainer. Typically retainer 102 is crimped by a press after the fastener 104 is inserted into the retainer. Fastener 104 may be a floating nut having blind thread (internal threads and a closed end). Fastener 104 may float partially or entirely within retainer 102. For example, the closed end of fastener 104 may extend out from retainer 102. Alternatively the entire fastener 104 may rest within retainer 102. For illustrative purposes, FIG. 2 shows an isometric view of fastener 104 separated from retainer 102 in one or more embodiments of the present disclosure.

Figure 3:
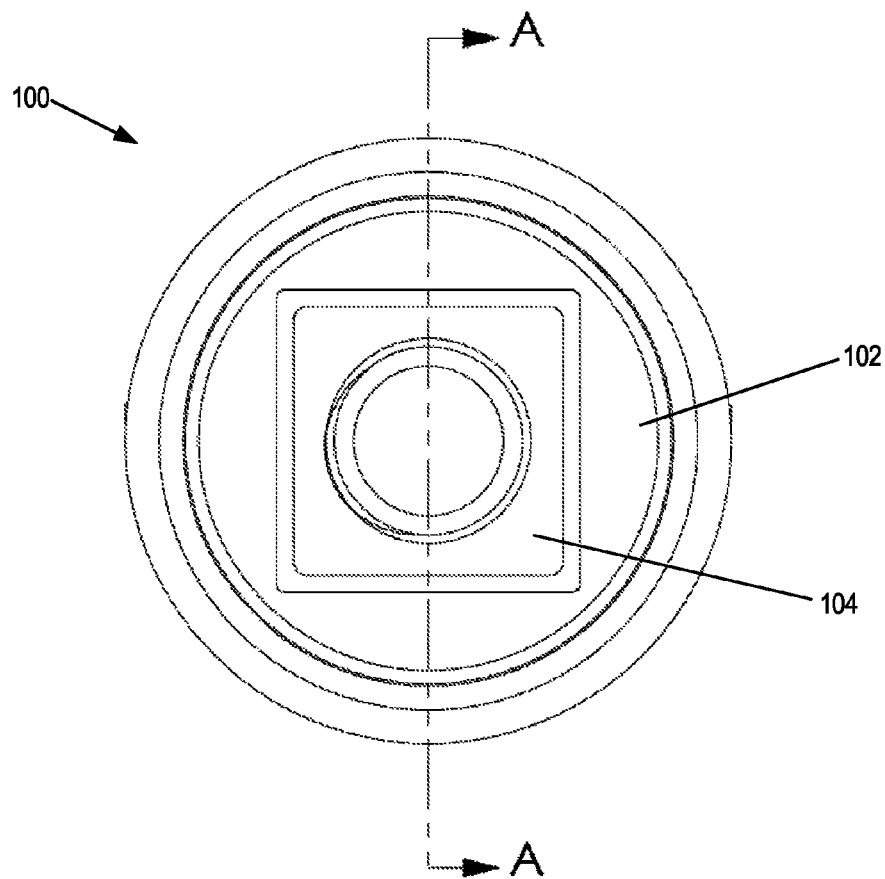
FIG. 3 shows a bottom view of the fastener device in one or more embodiments of the present disclosure.
Figure 4:
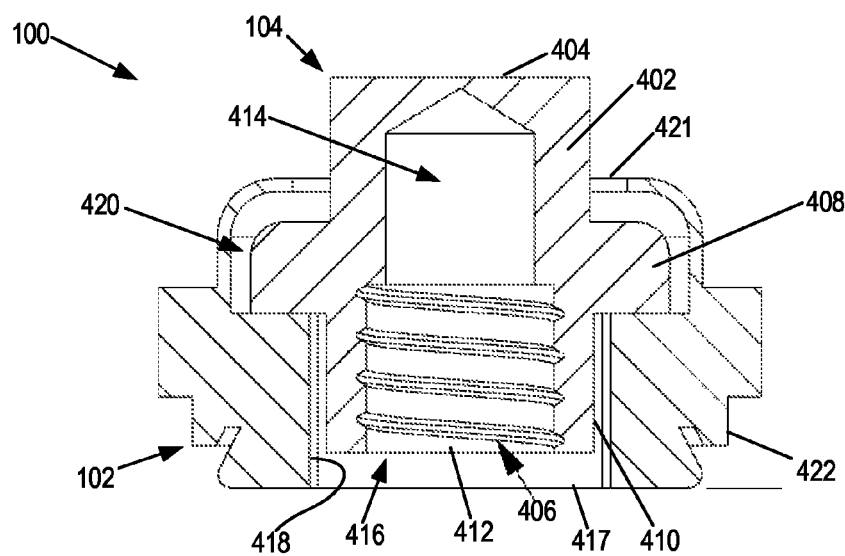
FIG. 4 shows a cross-sectional view of the fastener device across a line in FIG. 3 in one or more embodiments of the present disclosure.

FIG. 3 shows a bottom view of fastener device 100 in one or more embodiments of the present disclosure. FIG. 4 shows a cross-sectional view of fastener device 100 across line AA in FIG. 3 in one or more embodiments of the present disclosure. Fastener 104 includes a shank 402 with a closed end 404, internal threads 406 inside the shank, a flange 408 around the middle of the shank, and an insert feature 410 around an open end 412 of the shank below the flange. Insert feature 410 may be a square insert or another similarly shaped insert (e.g., a pentagon or a hexagon insert). Internal threads 406 may travel from open end 412 partially up shank 402.

Shank 402 may include a blind chamber 414 that collects debris generated when a male fastener is inserted and tightened. When fastener device 100 is mounted to a sheet that forms part of an enclosure, blind chamber 414 prevents the debris from falling into the enclosure and otherwise compromise sensitive equipment within the enclosure. For example, the debris from the fastener and the nut may short out circuitry or damage particulate sensitive items within the enclosure. Blind chamber 414 may be unthreaded.

Retainer 102 defines a first hole 416 that forms an open end 417 for receiving a male fastener. First hole 416 has a retainer feature 418 that fits around insert feature 410 of fastener 104. Retainer feature 418 is sized larger than insert feature 410 to give fastener 104 a desired play within retainer 102 but still refrain the fastener from rotating when a male fastener is inserted and tightened. Retainer feature 418 may be a square retainer or another similarly shaped retainer (e.g., a pentagon or a hexagon retainer).

Retainer 102 further defines a second hole 420 that is in communication with first hole 416. Second hole 420 forms an open end 421 from which closed end 404 of fastener 104 extends. Second hole 420 holds flange 408 so fastener 104 is permanently captured in retainer 102. Second hole 420 may be sized larger than flange 408 to give the same or similar tolerance for mating hole misalignment as retainer feature 418 and insert feature 410.

Retainer 102 includes a clinching ring 422 for mounting to a hole in a sheet. Clinching ring 422 may be serrated, knurled, ribbed, or otherwise shaped to prevent rotation of retainer 102 once installed into the hole.

Figure 5:
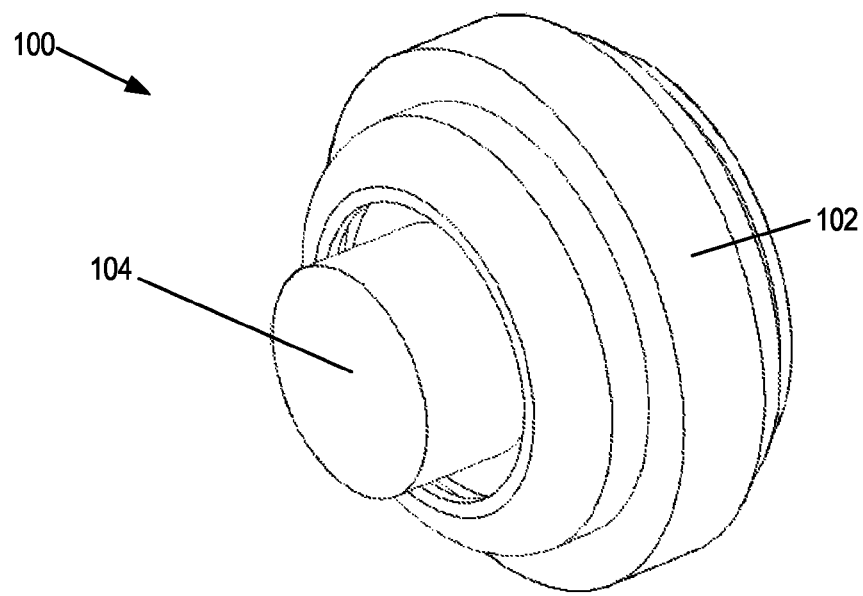
FIG. 5 shows an isometric view of the fastener device from another angle in one or more embodiments of the present disclosure.
Figure 6:
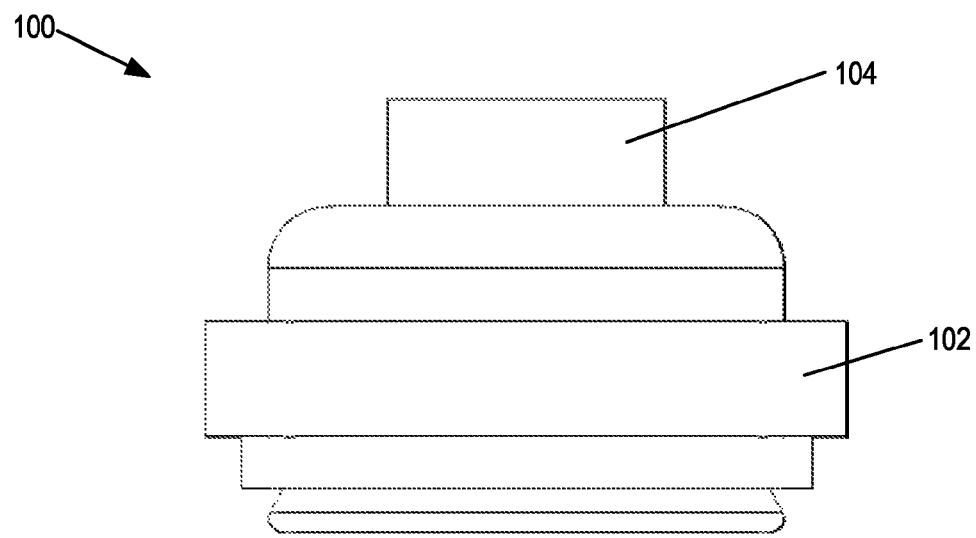
FIG. 6 shows a right side view of the fastener device, with left side, front, and rear views being substantially identical or symmetrical thereto, in one or more embodiments of the present disclosure.
Figure 7:
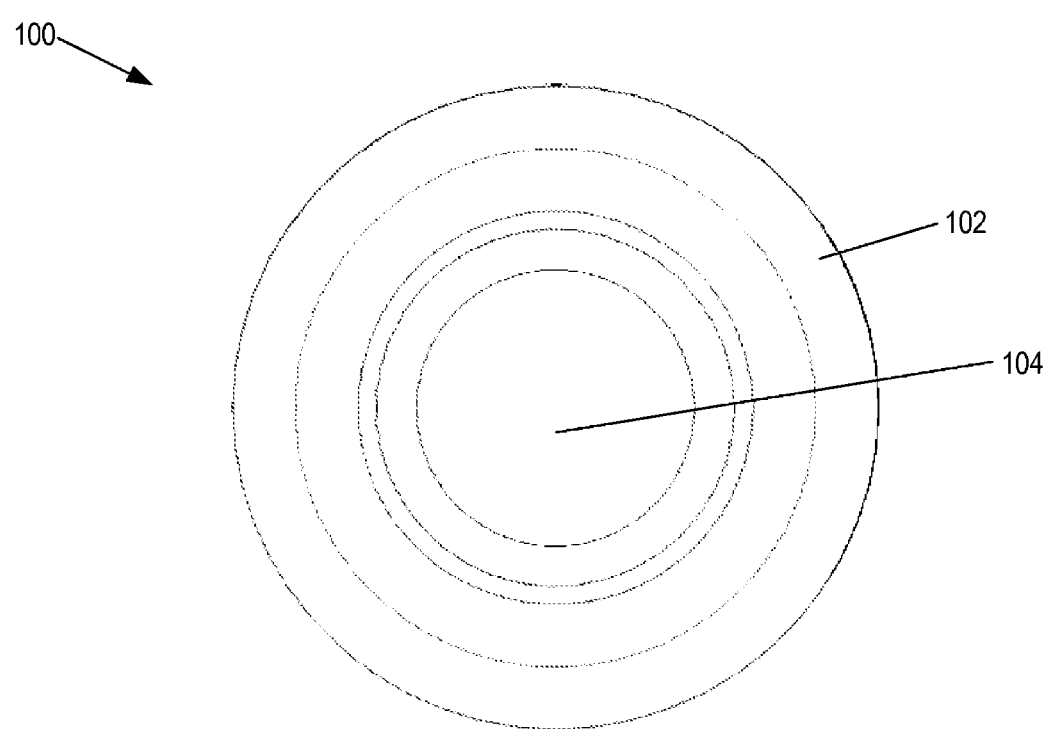
FIG. 7 shows a top view of the fastener device in one or more embodiments of the present disclosure.

FIGS. 5, 6, and 7 provide additional views of fastener device 100. FIG. 5 shows an isometric view of fastener device 100 from another angle in one or more embodiments of the present disclosure. FIG. 6 shows a right side view of fastener device 100, with left side, front, and rear views being substantially identical or symmetrical thereto, in one or more embodiments of the present disclosure. FIG. 7 show a top view of fastener device 100 in one or more embodiments of the present disclosure.

Various other adaptations and combinations of features of the embodiments disclosed are within the scope of the invention. Numerous embodiments are encompassed by the following claims.

The invention claimed is:

1. A fastener device mountable to a hole in a sheet, comprising:
   a self-clinching retainer mountable to the hole; and a blind fastener at least partially floating within the self-clinching retainer, the blind fastener comprising blind thread;

wherein:

the blind fastener comprises a shank with a closed end, internal threads inside the shank, a flange around the shank, and an insert feature defined around an open end of the shank below the flange; and the self-clinching retainer defines a first hole with a retainer feature receiving the insert feature of the blind fastener, and a second hole in communication with the first hole for receiving the flange of the blind fastener.

2. The fastener device of claim 1, wherein the insert feature comprises a square insert and the retainer feature comprises a square retainer.

3. The fastener device of claim 1, wherein the internal threads travel from the open end of the shank partially up the shank and an unthreaded internal portion of the shank forms a blind chamber.

4. The fastener device of claim 1, wherein the closed end of the blind fastener extend out from the retainer.

5. The fastener device of claim 1, wherein the self-clinching retainer comprises a clinching ring.

6. A fastener device mountable to a hole in a sheet, comprising:

a self-clinching retainer mountable to the hole, the self-clinching retainer defining:

a first hole with a retainer feature; and a second hole in communication with the first hole; and a blind fastener at least partially floating within the self-clinching retainer, the blind fastener comprising:

internal threads;

a flange received in the second hole of the self-clinching retainer; and an insert feature below the flange received in the retainer feature of the self-clinching retainer.

7. The fastener device of claim 6, wherein the insert feature comprises a square insert and the retainer feature comprises a square retainer.

8. The fastener device of claim 6, wherein the self-clinching retainer comprises a clinching ring.

* * * * *